United States Patent [19]

Cleary

[11] 3,822,699
[45] July 9, 1974

[54] INSTRUMENT FOR MEASURING MAXIMUM EXPIRATORY FLOW RATE

[76] Inventor: James M. Cleary, P.O. Box 541, Falmouth, Mass. 02541

[22] Filed: Feb. 28, 1973

[21] Appl. No.: 336,406

Related U.S. Application Data

[63] Continuation-in-part of Ser. No. 186,663, Oct. 5, 1971, Pat. No. 3,720,202.

[52] U.S. Cl.................... 128/2.08, 73/239, 128/208
[51] Int. Cl. ....................... A61b 5/08, A61m 16/00
[58] Field of Search............. 128/2.08; 73/205 L, 4, 73/146.3, 146.8, 419

[56] References Cited
UNITED STATES PATENTS

| | | | |
|---|---|---|---|
| 793,177 | 6/1905 | Cady | 128/2.08 |
| 3,635,214 | 1/1972 | Rand | 128/2.08 |
| 3,720,202 | 3/1973 | Cleary | 128/2.08 |

Primary Examiner—Aldrich F. Medbery
Attorney, Agent, or Firm—Charles F. Steininger

[57] ABSTRACT

An instrument for measuring maximum expiratory flow rate having a vertically-disposed cylinder with a plurality of equal sized orifices distributed along its length, a floating piston disposed in the cylinder having a guide rod passing through a closure on the top of the cylinder, a self-actuating brake means mounted on the guide rod above the piston and actuatable against the side of the cylinder, a holdback clip mounted on the cylinder closure and operatively engaging the guide rod to prevent the guide rod from moving downwardly once the piston has moved upwardly in the cylinder and a suitable, flexible air tube having a mouthpiece at one end and connected in open communication with the bottom of the cylinder at its other end. The instrument can also be provided with a check valve at the lower end of the cylinder to prevent backflow of air through the air tube and adjustable port means adjacent the base of the cylinder to adjust the range of the instrument.

15 Claims, 3 Drawing Figures

PATENTED JUL 9 1974 3,822,699

INSTRUMENT FOR MEASURING MAXIMUM EXPIRATORY FLOW RATE

CROSS REFERENCE TO RELATED APPLICATION

The present application is a continuation-in-part of copending application Ser. No. 186,663, having the same title and filed by the present applicant on Oct. 5, 1971 and now U.S. Pat. 3,720,202.

BACKGROUND OF THE INVENTION

The present invention relates to an instrument for measuring maximum expiratory flow rate. More specifically, the present invention relates to an instrument for measuring the conductivity of the respiratory system of a patient in the diagnosis of asthma and other respiratory diseases.

In the diagnosis of asthma and other respiratory diseases, the conductivity of the respiratory system is a useful parameter. Consequently, this conductivity of the respiratory system can be indirectly measured by measuring the maximum expiratory flow rate of the patient.

Heretofore, instruments for measuring maximum expiratory flow rate have been complicated and expensive. In addition, such complex instruments have an adverse psychological effect when a patient being treated is a child. Because of the complexity and size of these instruments, the child may view the test as a frightening experience.

Copending Application Ser. No. 186,663 describes and claims a simple, effective and inexpensive instrument for measuring the maximum expiratory flow rate of a patient. This instrument comprises a vertical cylinder having a plurality of orifices distributed along its length, a free floating piston in the cylinder adapted to move upwardly as air is forced into the bottom of the cylinder, a hold-back means to prevent the piston from freely moving downwardly once it has been forced upwardly and an air tube into which the patient blows. In the use of this instrument, it has been established that the maximum flow rate exists only momentarily during expiration. Consequently, the maximum reading may not be reached in a single attempt and, therefore, the patient should make several maximum expiratory efforts into the instrument. When the piston reaches the position corresponding to his maximum expiratory flow rate, he will not be able to move the piston upwardly any further in succeeding attempts. However, it has been found that, if the initial position of the piston assembly is far enough below the final position (maximum expiratory flow rate position), the piston may develop sufficient velocity to carry it past the true reading and thus produce a false reading.

It is, therefore, an object of the present invention to provide an instrument, of the character referred to in copending Application Ser. No. 186,663, which will effectively prevent the piston from overshooting the position of the piston representing the patient's true maximum expiratory flow rate.

SUMMARY OF THE INVENTION

The present invention comprises an instrument for measuring the maximum expiratory flow rate of a patient in which a vertically-disposed cylinder is provided with a plurality of equal size orifices distributed along its length, a free floating piston disposed in the cylinder and adapted to move upwardly as air is forced into the cylinder from the bottom, a guide rod mounted on the top of the piston and passing through a closure at the top of the cylinder, a self-actuating brake means mounted on the piston-guide rod assembly and adapted to be actuated against the side of the cylinder, a hold-back means, adapted to prevent the piston from freely moving downwardly in the cylinder, mounted on the top of the cylinder and operatively associated with the guide rod and an air tube in open communication with the bottom of the cylinder.

BRIEF DESCRIPTION OF THE DRAWINGS

Figures 1, 2, 3:
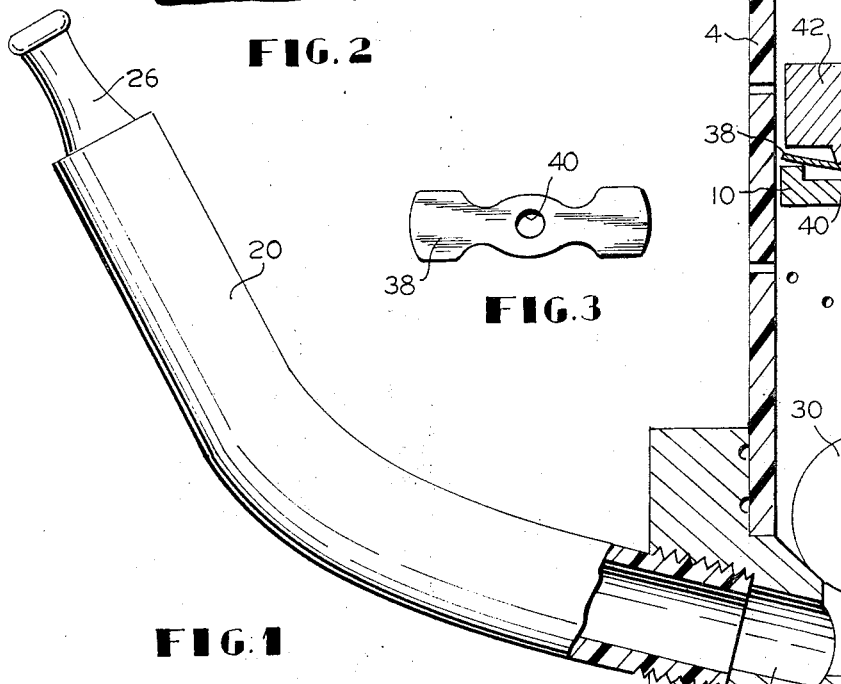

IN THE DRAWINGS:

FIG. 1 is an elevational view of the instrument of the present invention partially in section;

FIG. 2 is a detailed view partially in section showing the brake means of the instrument of FIG. 1 in its operative condition; and FIG. 3 is a top view of an element of the brake means of the previous Figures.

DESCRIPTION OF THE PREFERRED EMBODIMENTS

In accordance with the drawings, a suitable base having sufficient bulk to support the entire instrument is provided. Mounted in an opening at the top of base 2 is an orifice cylinder 4. Orifice cylinder 4 has a uniform central bore and a mutliplicity of equal sized orifices 6 passing through the wall of orifice cylinder 4. Orifice cylinder 4 is preferably made of a clear plastic material so that the operation of the device can be observed from the exterior, and the cylinder itself may be provided with appropriate calibration marks 8 along its length. The piston 10 applies a constant back pressure to the orifices as it moves upward. Therefore, if orifices 6 are of equal size, the flow rate, Q, is a straight line function of the number of orifices exposed to the flow, N. Calibration of the instrument therefore amounts to determining a constant K for the instrument such that $$Q = KN \tag{1}$$

It is convenient to place a calibration mark between each group of ten holes to facilitate the hole count. Mounted within cylinder 4 is an appropriate free floating piston 10. Extending upwardly from piston 10 is piston guide rod 12. Piston 10 and guide rod 12, therefore, form a unitary piston-guide rod assembly. Piston-guide rod 12 passes through guide bushing 14 which also serves as a closure for the top of cylinder 4. Thus, by calibrating cylinder 4 by means of calibration marks 8, one can observe the position of piston 10 with a relation to the calibration marks 8. Alternatively, guide rod 12 can be provided with suitable calibration marks, and the relation of these marks to guide bushing 14 can be observed. In this case, the orifice cylinder 4 need not be transparent. In order to prevent piston 10 from moving downwardly of its own weight once it has been moved to an upper position, a holdback clip 16 is mounted on guide bushing 14 having an aperture 18 which passes over guide rod 12. Consequently, since holdback clip 16 is inclined slightly from the horizontal, the guide rod 10 moves freely upwardly through the aperture 18 but, with a slight downward movement of the guide rod, the clip 16 will tilt downwardly causing the rod 12 to bind in the aperture 18 and thus prevent the rod from moving downwardly unless the clip 16 is pulled upwardly by the operator to release the rod.

A suitable, flexible plastic tube 20 is mounted in base 2 just below the bottom of orifice cylinder 4. Tube 20 is in open communication with orifice cylinder 4 through air aperture 22 and air chamber 24 formed in the base. Flexible air tube 20 is preferably provided with a disposable mouth piece 26 into which the patient blows.

As a sanitary precaution, the base 2 may have formed therein a valve seat 28. This valve seat 28 cooperates with a lightweight ball 30 disposed within orifice cylinder 4, and the seat and ball 28 and 30, respectively, form an appropriate check valve to prevent reverse flow of air from orifice cylinder 4 through tube 20. Ball 30 may appropriately be a conventional ping pong ball or the like.

Since maximum expiratory flow rates vary over a wide range, it is also desirable to provide means for changing the range of the instrument. This means for shifting the range of the instrument may simply comprise an aperture 32 through base 2 which cooperates with an aperture 34 in the wall of orifice cylinder 4. Orifice cylinder 4 may be turned or twisted in base 2 to thereby open or close aperture 34. The means for shifting the range of the instrument must also be calibrated. Marks 36 may be disposed circumferentially about orifice cylinder 4 and cooperate with zero marks on the top of base 2 to indicate fully open and fully closed positions. The aperture 34 is of such a size that it may be equivalent, for example, to 50 of the orifices 6. Since the pressure drop across the range shift orifice is constant while the piston moves upward, the flow rate through it, $Q_o$, is constant. When the range shift orifice is open, the flow equation for the instrument is then:

$$Q = KN + Q_o$$

(2)

Referring specifically to FIGS. 1, 2 and 3, the piston 10 is further provided with an upstanding annular rim or seat 36. Annular rim 36 serves as a seat for leaf spring 38. Leaf spring 38 has a central aperture 40 which loosely fits spring 38 on the guide rod 12 and has its ends rounded to conform to the shape of the interior wall of cylinder 4, as shown in FIG. 3. Slidably mounted on guide rod 12, above spring 38, is bob or weight 42. When spring 38 is relaxed, as shown in FIG. 2, it has a length slightly greater than the internal diameter of cylinder 4. However, when weight 42 rests on spring 38 adjacent its center, the center portion of spring 38 will be deflected downwardly and the ends thereof will be drawn inwardly. Accordingly, spring 38 will then have an effective length slightly less than the inside diameter of cylinder 4. Thus, when spring 38 is loaded by weight 42, piston 10 can move freely up and down inside the cylinder 4. However, if the loading of spring 38 becomes less than the weight of the weight 42, the ends of spring 38 will contact the inside of cylinder 4 and produce a drag or braking force. The mass of weight 42 should be greater than the mass of the piston-guide rod assembly 10–12 and preferably about twice as great. In addition, the total mass of piston-guide rod assembly 10–12 and brake means 38–42 should be the same as the mass of the piston and guide rod of copending Application Ser. No. 186,663.

OPERATION OF THE INSTRUMENT

Since the maximum expiratory flow rate of a patient exists only momentarily during expiration, the maximum reading of the device may not be obtained when the first test is conducted. Therefore, to assure that a maximum reading has been obtained, the patient being tested is allowed to perform the test 2 or more times. When the piston reaches the position corresponding to the patient's maximum expiratory flow rate, the patient will no longer be able to move the piston no matter how many times he tries.

Specifically, the patient being tested blows into the mouthpiece 26 of the instrument as rapidly as he is able. The main passages of the instrument are sufficiently large so as not to restrict the flow of air. The ball 30 is lifted from seat 28 allowing air to flow up into the orifice cylinder 4. In a specific example, the ball will weigh 1.7 gms. and be disposed within an orifice cylinder having an internal bore of 13.8 cm$^2$. The ball thus will contribute a negligable back pressure of approximately 0.12 gm./cm.$^2$. The purpose of the ball is to prevent backflow from the orifice cylinder 4 through the air tube 20. As air enters the orifice cylinder, the piston rises in the cylinder uncovering successive orifices. Finally, as sufficient orifices are uncovered by the piston, these orifices will accommodate the entire flow of air under the back pressure imposed by the total weight of the piston-guide rod assembly 10–12 and the brake means 38–42. For example, if the total weight is 55 gms., the pressure inside the cylinder required to elevate the piston is then 4 gms./cm.$^2$. The piston therefore moves upwardly until a sufficient number of orifices have been passed by the piston to accept the entire flow rate at 4 gms./cm.$^2$ pressure differential. As previously indicated, the holdback clip 16 permits the piston 10 and the piston guide rod 12 to move upwardly freely but prevents the guide rod and piston from moving downwardly. The piston and guide rod may, of course, be permitted to move to their lowermost position by simply lifting the spring-type clip 16 upwardly.

In the event that the initial position of piston 10 is a substantial distance below the final position, which would indicate maximum expiratory flow rate, the piston will undergo a positive acceleration over most of its upward travel. The load on spring 38 is therefore greater than the static weight of weight 42. The action of the brake means 38–42 is triggered when the pressure under the piston 10 is less than necessary to sustain the weight of piston-guide rod assembly 10–12 and brake means 38–42. The piston then begins to decelerate so that the load on spring 38 becomes less than the weight of weight 42. Accordingly, with the load on spring 38 lessened, spring 38 begins to straighten and its ends begin to drag on the internal surface of cylinder 4. This drag further increases the deceleration of piston 10 with a consequent increase in the braking force. Thus, the brake means 38–42 acts as a self-energizing brake. The braking force increases suddenly to its maximum value. Piston 38 then stops abruptly while the weight 42 is free to coast upward a short distance and then fall back. Initiation of the braking action occurs a short distance below the position of piston 10 which indicates maximum expiratory flow rate. FIG. 2 illustrates the brake means assembly 38–42 with the spring 38 set in the braking position and weight 42 continuing upward.

A satisfactory spring 38 is made of beryllium-copper spring alloy 0.008 inches thick. Its length is 2.678 inches, however when centrally loaded by a 100 gm. bob 42, its deflected length is 2.664. The change in length due to the static load of the bob 42 is then 0.014 inches. The bore of the orifice cylinder is 2.666. Accurate finishing of the inside diameter of cylinder 4 and the length of spring 38 are obviously required for proper functioning of the instrument.

While a specific device has been described herein having specific elements and features, it is to be understood that these illustrations are to be non-limiting and that the present invention is to be limited only in accordance with the appended claims.

I claim:

1. Apparatus for measuring a patient's maximum expiratory flow rate, comprising; a cylinder having a central bore of equal diameter throughout its length, one end closed and the other end provided with an air inlet means to form a closed chamber except for said air inlet, air tube means having one end in open communication with said air inlet and the other end provided with a sanitary mouth piece, restricted air outlet means in said chamber to permit regulated amounts of air to escape from said chamber, piston means slidably mounted in said cylinder and moveable toward said closed end in response to the pressure of air passing through said air inlet and brake means carried by said piston means selectively engaging said bore to decelerate and stop the upward movement of said piston means as the air pressure moving said piston means decreases.

2. Apparatus in accordance with claim 1 wherein the air outlet means is a plurality of equal-diameter orifices passing through the wall of the cylinder and spaced along the length of said cylinder.

3. Apparatus in accordance with claim 1 wherein guide rod means has one end thereof attached to the piston means and the body thereof slidably passing through the closed end of the cylinder.

4. Apparatus in accordance with claim 3 wherein holdback means is mounted in operative relation with the guide rod and adjacent the closed end of the cylinder to releasably hold said guide rod and prevent said guide rod and piston from sliding toward the air inlet while permitting free movement of said guide rod and said piston toward said closed end of said cylinder.

5. Apparatus in accordance with claim 1 wherein the brake means includes a flat flexible element having a maximum dimension such as to frictionally contact the wall of the cylinder when fully extended in an unflexed condition and to be free of said wall of said cylinder when flexed and means for flexing said flexible element.

6. Apparatus in accordance with claim 5 wherein the means for flexing the flexible element is a weight.

7. Apparatus in accordance with claim 6 wherein guide rod means has one end thereof attached to the piston and the body thereof slidably passing through the closed end of the cylinder and the flexible element and the weight are freely slidably mounted on said guide rod between said piston and said closed end of said cylinder.

8. Apparatus in accordance with claim 6 wherein the mass of the weight is greater than the mass of the guide rod plus the piston.

9. Apparatus in accordance with claim 1 wherein the cylinder is transparent and calibrated to indicate the position of the piston within said cylinder.

10. Apparatus in accordance with claim 1 wherein the holdback means is a spring type clip having an aperture therethrough through which the guide rod passes and is bent toward the closed end of the cylinder.

11. Apparatus in accordance with claim 1 wherein the air inlet includes a base and said base has an air passage therein connecting said cylinder and the air tube.

12. Apparatus in accordance with claim 11 wherein the air passage in the base has a check valve formed therein to prevent passage of air from the cylinder to the air tube while permitting passage of air from said air tube to said cylinder.

13. Apparatus in accordance with claim 12 wherein the check valve comprises a valve seat formed in the base adjacent the open end of the cylinder and a free floating ball disposed above said seat.

14. Apparatus in accordance with claim 1 wherein the cylinder has operatively associated therewith means for changing the amount of air which can pass out of said cylinder below the piston.

15. Apparatus in accordance with claim 14 wherein the air inlet includes a base and said base has an air passage therein connecting said cylinder and the air tube, the cylinder is rotatably mounted in said base and the means for changing the amount of air which can pass out of said cylinder is an orifice through the wall of said cylinder registerable with an orifice through said base.

* * * * *